US008803922B2

(12) United States Patent
Marcu

(10) Patent No.: US 8,803,922 B2
(45) Date of Patent: Aug. 12, 2014

(54) METHODS AND APPARATUSES FOR INCREASING THE APPARENT BRIGHTNESS OF A DISPLAY

(75) Inventor: Gabriel Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 725 days.

(21) Appl. No.: 11/809,019

(22) Filed: May 30, 2007

(65) Prior Publication Data

US 2008/0297451 A1 Dec. 4, 2008

(51) Int. Cl.

*G09G 5/10* (2006.01)
*H04N 5/202* (2006.01)
*G06K 9/00* (2006.01)

(52) U.S. Cl.

USPC ............................ 345/690; 348/674; 382/169

(58) Field of Classification Search

CPC .................... G09G 3/2007; G09G 2320/0233; G09G 2320/0271; G09G 2320/0276; G09G 2320/0626; G09G 2320/0673
USPC ................. 345/589–590, 600–601, 617, 690; 348/671–678, 687; 382/168–172, 382/270–275
See application file for complete search history.

(56) References Cited

U.S. PATENT DOCUMENTS 5,546,101 A * 8/1996 Sugawara ....................... 345/63
5,790,280 A * 8/1998 Terashita ....................... 358/501
5,933,199 A * 8/1999 Yoon ............................. 348/674
6,111,607 A * 8/2000 Kameyama ................... 348/256
6,130,763 A * 10/2000 Ohta et al. .................... 358/518
6,204,940 B1 * 3/2001 Lin et al. ....................... 358/527
6,493,468 B1 * 12/2002 Matsuura ...................... 382/274
7,088,058 B2 * 8/2006 Shiota et al. .................. 315/291
7,167,214 B2 * 1/2007 Hirosue ........................ 348/687
7,176,983 B2 * 2/2007 Chiang et al. ................. 348/630
7,245,308 B2 * 7/2007 Kiuchi et al. ................. 345/643
7,251,056 B2 * 7/2007 Matsushima ................. 358/1.9
7,319,787 B2 * 1/2008 Trifonov et al. .............. 382/168
7,369,183 B2 * 5/2008 Oka et al. ...................... 348/674
7,433,064 B2 * 10/2008 Takahashi .................... 358/1.13
7,508,457 B2 * 3/2009 Yamagishi et al. ........... 348/672
7,573,533 B2 * 8/2009 Moldvai ........................ 348/678
7,580,064 B2 * 8/2009 Deguchi et al. ............ 348/231.7
7,580,566 B2 * 8/2009 Fukuda et al. ................ 382/168
7,773,158 B2 * 8/2010 Yamashita et al. ............ 348/678
7,843,473 B2 * 11/2010 Arimoto et al. ............... 345/690
7,940,245 B2 * 5/2011 Park et al. ..................... 345/102
8,014,602 B2 * 9/2011 Ohara ........................... 382/171
2002/0006230 A1 * 1/2002 Enomoto ...................... 382/261
2002/0050987 A1 * 5/2002 Sakashita ...................... 345/204

(Continued)

*Primary Examiner* — Joe H Cheng
*Assistant Examiner* — Keith Crawley
(74) *Attorney, Agent, or Firm* — Blakely, Sokoloff, Taylor & Zafman LLP

(57) ABSTRACT

Methods and apparatuses to varying the apparent brightness of a display are described. The change in apparent brightness is accompanied by unchanged in relative contrast, rendering a display with higher or lower brightness while maintaining contrast fidelity. In exemplary embodiments, the signals for the middle tone levels are adjusted to increase or decrease the brightness intensity, while keeping constant the gamma correction. This maintains the relative contrast of images while rendering them at a different brightness. Implementations of the present process include an adjusted gamma correction lookup table, incorporated in the video card to modify the video signal before reaching the display. The present invention can be used for matching the brightness of two or more displays or to provide compensation for variations in display characteristics to ensure consistency in display brightness within a data processing model.

24 Claims, 11 Drawing Sheets

(56) References Cited

U.S. PATENT DOCUMENTS

| | | | | |
|---|---|---|---|---|
| 2003/0020974 | A1 * | 1/2003 | Matsushima | 358/521 |
| 2003/0117654 | A1 * | 6/2003 | Wredenhagen et al. | 358/3.21 |
| 2003/0179926 | A1 * | 9/2003 | Yamazoe et al. | 382/167 |
| 2004/0130638 | A1 * | 7/2004 | Sakamoto | 348/254 |
| 2004/0184671 | A1 * | 9/2004 | Fukuda et al. | 382/274 |
| 2005/0012866 | A1 * | 1/2005 | Chiang et al. | 348/625 |
| 2005/0094892 | A1 * | 5/2005 | Choe et al. | 382/274 |
| 2005/0163372 | A1 * | 7/2005 | Kida et al. | 382/169 |
| 2005/0180629 | A1 * | 8/2005 | Masuno et al. | 382/169 |
| 2005/0212736 | A1 * | 9/2005 | Lu et al. | 345/87 |
| 2005/0242741 | A1 * | 11/2005 | Shiota et al. | 315/112 |
| 2006/0066756 | A1 * | 3/2006 | Yamagishi et al. | 348/672 |
| 2006/0098024 | A1 * | 5/2006 | Kohno | 345/589 |
| 2006/0103683 | A1 * | 5/2006 | Kang | 345/690 |
| 2006/0284895 | A1 * | 12/2006 | Marcu et al. | 345/690 |
| 2007/0053607 | A1 * | 3/2007 | Mitsunaga | 382/274 |
| 2007/0076949 | A1 * | 4/2007 | Kanai | 382/169 |
| 2007/0080975 | A1 * | 4/2007 | Yamashita et al. | 345/591 |
| 2007/0237392 | A1 * | 10/2007 | Ohara | 382/171 |
| 2007/0285576 | A1 * | 12/2007 | Moore et al. | 348/674 |
| 2007/0286533 | A1 * | 12/2007 | Harada | 382/309 |
| 2008/0129860 | A1 * | 6/2008 | Arakawa | 348/363 |
| 2009/0040297 | A1 * | 2/2009 | Harada et al. | 348/54 |

* cited by examiner

METHODS AND APPARATUSES FOR INCREASING THE APPARENT BRIGHTNESS OF A DISPLAY

BACKGROUND

Electronic displays or monitors can be fabricated using different display technologies, such as cathode-ray tube (CRT), electroluminescent displays (ELD), light-emitting diode displays (LED), liquid crystal displays (LCD), and plasma display panel (PDP).

In CRT technology, electron beams scan across a display surface line by line in order to provide each pixel data to the display surface. The display data is thus represented by the pixels via the electron beam current. Modulation of the electron beam current varies the characteristics of the displayed image.

In electroluminescence, a material, called electroluminescent material, emits light in response to an electric current or an electric field. Electroluminescence is the result of the recombination of electrons and holes in the electroluminescent material where the excited particles release their energy as photons. An electroluminescent display can be constructed by sandwiching a layer of electroluminescent material such as GaAs between two layers of conductors. Each conductor layer has parallel electrode strips running perpendicular to each other. One layer must be transparent in order to emit light. At each intersection is a pixel emitting visible light when a current flows.

In LCD, each pixel consists of a liquid crystal blocking or unblocking incoming light in response to the electric field between the electrodes. In the absence of an electric field, the liquid crystal molecules are arranged to allow the light to pass through, and the pixel appears transparent. When a voltage is applied across the electrodes, the liquid crystal molecules are distorted, reducing the passing light, and the pixel appears gray. For higher voltage, the liquid crystal molecules are completely distorted and the pixel will appear black. By controlling the voltage applied across the liquid crystal layer in each pixel, passing light can be controlled which illuminates the pixel correspondingly.

In PDP, each pixel comprises an ionizable gas such as neon or xenon. When an electric field is applied across the electrodes, the gas ionizes to form a plasma and as the ions accelerating toward and colliding with the electrodes, photons are emitted. By controlling the voltage applied across the ionized gas in each pixel, generated light from each pixel can be controlled.

Generally, electronic displays can be classified into two major types. One includes light emitter displays where the pixels emit photons (CRT, ELD, LED, PDP) and one includes light modulator displays where the pixels allow the passage of light (LCD). In light emitter displays, the maximum display brightness is controlled by the current or voltage applied to the individual pixels, subjected to their material and physical limitations.

In light modulator displays, the classification can further include displays using reflective light where light is reflected back toward the viewer after passing through the modulated pixels. Displays may also be transmissive, wherein light is radiated toward the viewer after passing through the modulated pixels. Other displays may also be transflexive, a combination of reflective and transmissive with two sources of light, one to reflect and one to radiate toward the viewer. In light modulator displays, the maximum display brightness is controlled by the light sources, and the individual modulated elements control the perceived brightness of a pixel.

Display systems are judged by many metrics, including horizontal and vertical resolution, brightness, color purity, display size, frame rate, and image artifacts. Some of these characteristics are more important than the others, depending on the customers, and sometimes simply because they are compared directly while on display in a store.

Brightness, or maximum brightness of a display, is one important characteristic for display systems since bright images are a general consumers' preference. The brightness of an image on an electronic display is characterized by luminance measured in luminous intensity (candela) per unit area ($cd/m^2$=1 nit). The brightness of CRT or PDP can be controlled by varying the current or voltage to the display, while for LCDs, by varying the intensity of the light sources. However, this simple brightness control can introduce image artifacts of contrast fidelity, or color washed out.

Image contrast in a display is another important attribute. Maximum image contrast describes the achievable light intensity difference in the image between the brightest and dimmest pixels. Contrast is also affected by ambient illumination, since it is also added to the display intensity of the displayed image. However, contrast fidelity, the ability to provide contrast approaching that of natural pictures, is the criterion for a best image display, and maximum contrast merely provides the adjustment capability to achieve contrast fidelity.

Thus consistent maximum brightness is a big concern for electronic display manufacturing, since not all displays have the same maximum brightness given the variations in materials, process equipment, manufacturing process, and operation parameters. Further, with contract manufacturing and OEM (original equipment manufacturer) services, maximum brightness might be very noticeable, especially when viewing next to each other as in a display showcase.

SUMMARY

Exemplary embodiments of methods and apparatuses to varying the apparent brightness of a display are described. In the following, by apparent brightness we understand the brightness of an average image (photograph, natural scene, video or DVD content) that is shown on a display. For those images for which the intensity of the signal is on average concentrated in the middle tones, the apparent brightness is determined by the intensity of the middle tones levels in the image. In the same context, the relative contrast represents the relative relationship between colors in the image. The change in apparent brightness is preferably accompanied by unchanged in relative contrast, rendering a display with higher or lower brightness while maintaining contrast fidelity.

In an embodiment, the signals for the middle tone levels are adjusted to increase or decrease the brightness intensity, while keeping the gamma correction unchanged. This maintains the relative contrast of images optimized for a certain gamma correction and renders them at different brightness. Signals in the lower level, e.g., shadow level, and in the higher level, e.g., highlight level, are smoothly interpolated to darkness (e.g., 0, representing black), and maximum brightness (e.g. 1, representing white) respectively in order to ensure the correct rendering of the displayed image.

In exemplary embodiments, the output values of the video card for the middle tones are shifted up, which result in a higher brightness of the middle tones, while maintaining the relationship of gamma correction so that the relative contrast of the middle tones is preserved. For the shadow and highlight levels, the output values are interpolated to e.g. black and white to avoid image washed out, such as loss of details in the dark or white areas.

In an embodiment, the look up table (LUT) in the video card, which serves to provide gamma correction, is modified to vary the apparent brightness of the display. The middle tones of the LUT are shifted up (which results in a higher brightness for the middle tones) or shifted down (which results in a lower brightness for the middle tones) but still maintaining the relationship between the LUT values to provide the same apparent gamma correction and preserving the relative contrast for the middle tones. For the shadow and highlight input range, the video card LUT values are smoothly interpolated to 0 and respectively 1 in order to ensure the correct rendering of black and whites of the display. In one aspect, the true white and true black values of the display are not changed (i.e. the maximum brightness and the black level remain unchanged) but the middle tones are shifted to a higher brightness while maintaining constant the gamma correction in that range.

In exemplary embodiments, the apparent brightness adjustment method uses the conventional hardware gamma correction, namely the video card look-up table and the signal processing is performed in real time for any content passing the video card LUT. In one aspect, the brightness adjustment method does not increase the power consumption for LCD display by modulating the transparency of the pixels and not the LCD backlight.

In exemplary embodiments, the apparent brightness adjustment method can be used for matching the brightness of two or more displays, for example, disposed side by side facing a viewer. A small difference in brightness between two displays, normally not observable otherwise, will be noticeable when located next to each other. In one aspect, the disclosed method can provide default calibration that compensates brightness differences of various displays to synchronize the brightness.

In an embodiment, the disclosed method shifts the gamma correction curves of the displays so that the apparent maximum brightness of one display matches the apparent maximum brightness of the other display. In one aspect, the gamma correction curve of the display with the lower maximum brightness is shifted up to increase the luminance of the middle tones to be closer to the luminance of the second display. In other aspect, the gamma correction curve of the display with the higher maximum brightness is shifted down to decrease the luminance of the middle tones to be closer to the luminance of the second display. In yet another aspect, the gamma correction curve of the display with the higher maximum brightness is shifted down to a middle level, and the gamma correction curve of the display with the lower maximum brightness is shifted up to the middle level.

In exemplary embodiments, the method can be employed in a manufacturing of a model of a data processing system comprising at least a display device. The manufactured display devices can have a range of maximum brightness levels. The method can assure that display devices all have the same apparent brightness level even though the manufactured display devices have different brightness level. The model stores a plurality of gamma correction structures associated with a plurality of display devices and selects the proper gamma correction structure for the installed display device.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily referenced to the same embodiment; and such references mean at least one.

In exemplary embodiments of the present invention, the apparent brightness of a display can be adjusted, preferably increased, while keeping the contrast fidelity. In one aspect, the invention employs conventional existing hardware. In other aspect, the present brightness adjustment does not require higher power consumption for brighter display. In an embodiment, the present apparent brightness adjustment can be used to accommodate for the difference between the brightness of two displays, e.g. located side by side, or for the difference between the brightness of the displays for a particular manufacturing model of data processing systems.

Different display devices typically have different brightness levels or maximum brightness, determined by the environment, the materials, composition, process equipment, fabrication process, manufacturing process and parameters. For examples, for emitter devices such as CRT or PDP, the display brightness can be adjusted by varying the light intensity emitted from the display pixels, which can be controlled by the varying the applied current or voltage to the display pixels. For light modulator devices such as LCD, the display brightness can be adjusted by varying the transparency of the display pixels or varying the reflected to transmitted light sources. However, the adjustment is limited, meaning there is an upper limit of maximum brightness where it is not advisable to cross, either because of the physical limitation of the display, because of the image fidelity or distortion, or because of safety or reliability concern.

Figure 1:
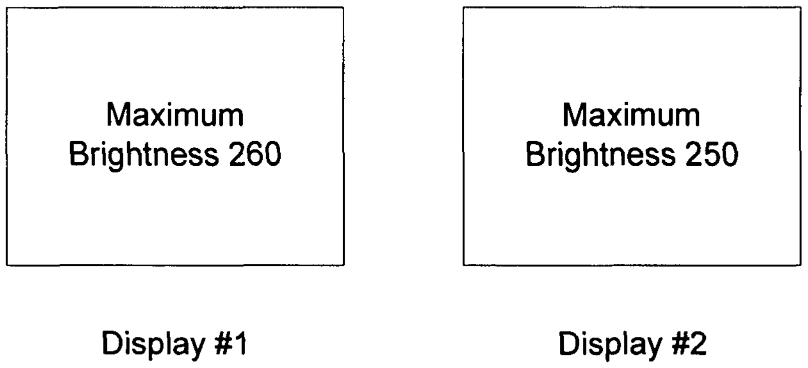
FIG. 1 illustrates the variation in brightness characteristic for various display models.

Technology advancement has made displays brighter and brighter. However, brightness consistency is not perfect, especially when compared side by side. FIG. 1 shows two displays located side by side, with display #1 having a maximum brightness of 260 nits and display #2 having a maximum brightness of 250 nits. Nit is a non-SI measuring unit for luminance, expressed in candela per square meter ($cd/m^2$), and often used to quote the brightness of a computer display. One nit is equal to one $cd/m^2$. When putting these displays apart, the different in brightness might not be noticeable, but when putting them together, the human eyes can perceive the difference in brightness, even a small difference like a few nits.

Figure 2A:
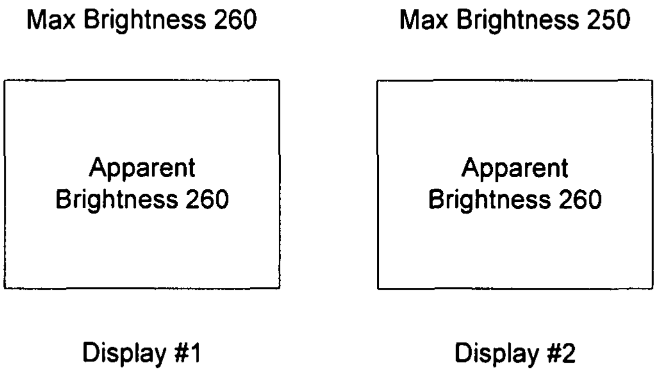
FIGS. 2A-2C illustrate exemplary embodiments of the present invention to achieve similar apparent maximum brightness level for displays having different maximum brightness.
Figure 2B:
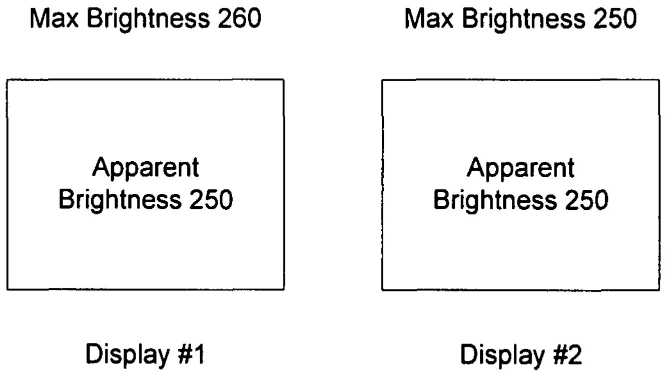
Figure 2C:
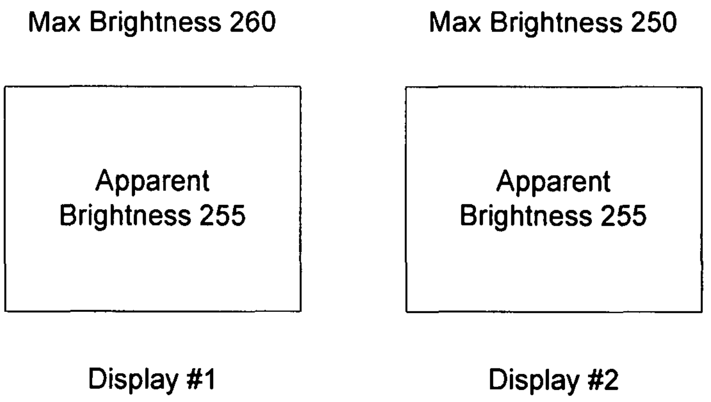

In an embodiment, the present invention provides maximum brightness adjustment for a display to achieve a desired apparent brightness. Adjusting maximum brightness can be performed for matching apparent brightness between two or more displays, as shown in FIG. 2, depicting two displays of FIG. 1 with different maximum brightness of 260 and 250 nits, respectively. In FIG. 2A, the brightness of display #2 is increased to achieve an apparent maximum brightness of 260 nits, matching that of display #1. In FIG. 2B, the brightness of display #1 is decreased to achieve an apparent maximum brightness of 250 nits, matching that of display #2. In FIG. 2C, the brightness of displays #1 and #2 is adjusted to achieve a same predetermined apparent maximum brightness, for example 255 nits.

Figure 3:
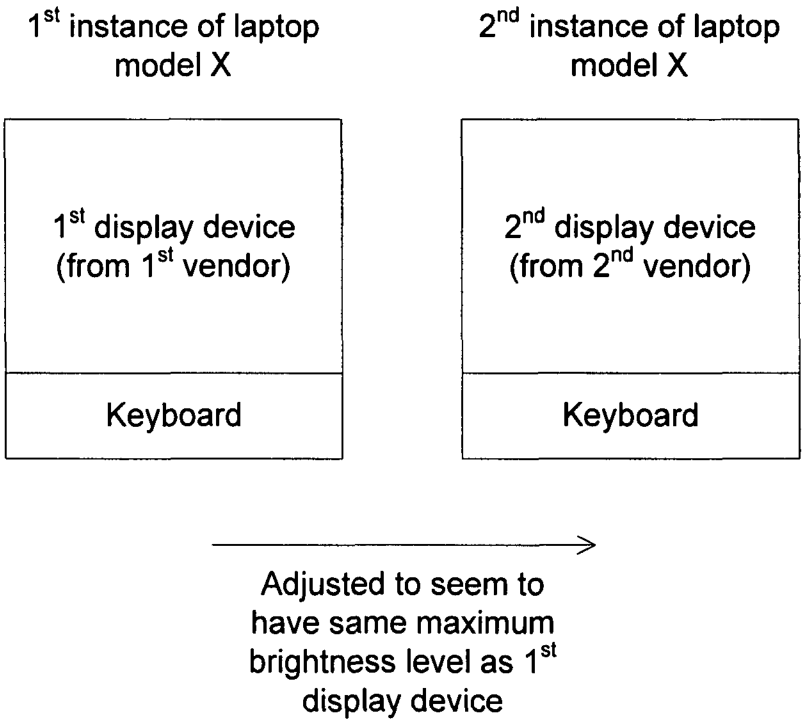
FIG. 3 illustrates an exemplary embodiment to achieve brightness consistency for various instances of a laptop model, even with variations in display maximum brightness.

In another embodiment, adjusting maximum brightness can be performed to ensure same apparent maximum brightness for a data processing system when connected to different displays having different maximum brightness. FIG. 3 depicts the same two displays #1 and #2 having different maximum brightness of 260 and 250 nits, respectively. To achieve an apparent maximum brightness of 260 nits, when display #1 is connected to the data processing system, no brightness adjustment is necessary. When data processing system is connected to display #2, maximum brightness of display #2 is increased to achieve the apparent maximum brightness value of 260 nits. The apparent maximum brightness value of 260 nits shown here is just an example of maximum brightness adjustment. Other adjustments might be performed to achieve any desirable apparent maximum brightness, such as 250 nits or any other values. In these cases, the maximum brightness of a display is adjusted when connected to a data processing system to ensure consistency of apparent brightness for different displays.

In some aspects, the first display comes from a first vendor, and the second display comes from a second and different vendor. With different vendors, the displays might have different maximum brightness level, even with the same fabrication processes. The present brightness adjustment process provides compensation for this brightness difference with different instances of a data processing model, for example a laptop computer model X. In the first instance, one unit of the laptop model X is equipped with the first display device having a first native maximum brightness. In the second instance, a second unit of the laptop model X is equipped with the second display device having a second, and possibly different, native maximum brightness. The present invention brightness adjustment provides the brightness compensation so that the second instance is adjusted to seem to have the same apparent maximum brightness level as the first display device. The first display device can also be a reference display model where all subsequence displays are adjusted to match the reference characteristics.

Some embodiments of the present invention may also be used with light emitter displays such as LED displays and plasma displays, in which the pixel elements emit light rather than reflect light from another source. Embodiments of the present invention may be used to enhance the apparent maximum brightness produced by these devices where the brightness of pixels within a certain ranges may be adjusted to provide the enhanced apparent brightness. Other embodiments of the present invention comprise systems and methods for varying a light modulated pixel level to compensate for a reduced maximum brightness level or to improve the maximum brightness level at a fixed light source illumination level.

In one embodiment of the present invention, it is recognizable that the majority of the image signals come from the middle tones, meaning the range of signals between total darkness and total brightness. Thus by increase the middle tone signals while keeping the contrast constant, apparent brightness of the display can increase beyond the maximum brightness level. In one aspect, the highlight section, i.e. the range of signals in the vicinity of total brightness, e.g. white level, is interpolated to total brightness to avoid white signal washed out and loss of details in the white section. In other aspect, the shadow section, i.e. the range of signals in the vicinity of total darkness, e.g. black level, is interpolated to total darkness to avoid black signal washed out and loss of details in the dark section.

Figure 4:
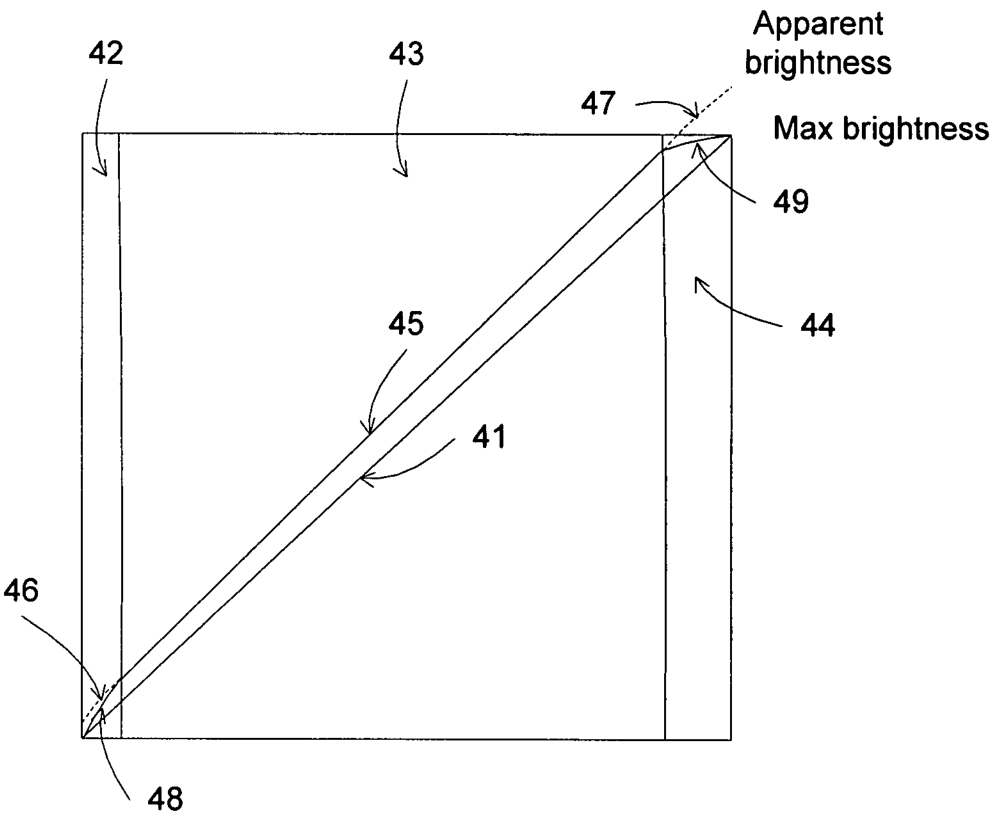
FIG. 4 illustrates an exemplary embodiment of signal adjustment to achieve a higher apparent maximum brightness.

Some of these embodiments may be explained with reference to FIG. 4 showing a relationship curve between the input and output signals. The curve in FIG. 4 is represented by linear segments, but the actual relationship could be more complex. The un-adjusted response is indicated by line 41, spanning from minimum signal representing a black level to maximum signal representing brightness, or white, for example native white point D65, representing a color temperature of 6500° K. which closely approximates natural sunlight. The maximum signal is also the manufacturing maximum brightness level, limited by the display hardware configuration. In an exemplary embodiment, the video signals are divided into three regions: a middle tone region 43, a shadow region 42, and a highlight region 44. In other embodiments, the video signals can be divided into only two regions, a middle tone region and a shadow region; or a middle tone region and a highlight region.

According to exemplary embodiments, the signals in the middle tone region are shifted up or adjusted to values with a higher luminance level while maintaining correct relative contrast for this region. These shifted up values may be represented as points along curve 45, boosted up from curve 41 in the middle tone region 43. The shifting of the curve segment 45 allows a higher apparent maximum brightness, higher than the manufacturing maximum brightness, as indicated by the extrapolation curve 47, which is the shifted portion of the highlight region.

In some embodiments, it is recognizable that increasing apparent brightness may be accomplished by adding an offset, this may raise black levels and cause signals in brighter region to go over the display maximum brightness level, resulting in signal clipping and image washed out or a loss of contrast at the upper end of the signal value range. In an aspect, display brightness adjusted in this way is compensated to prevent washed out highlights, loss of black level, or artificial look. In another aspect of the invention the shifting of the curve 45 is not an offset but a multiplication of curve 41 with a factor that will not modify the black levels but just raise the level of the curve as much as the curve approaches the white levels. In that case the blacks are not affected and the curve smooth out part is done only close to the maximum brightness in region 49. It will be apparent to one skillful in the field, that various techniques that translate the curve 45 with various amounts close to the shadow or highlights may be used in order to manipulate the apparent maximum brightness of the display.

In some aspects, the shadow region and the highlight region are selected to represent only a small portion of the total display signal, the small the better while still providing the desired apparent maximum brightness. The shadow region is preferably occurs less than 5%, and more preferably less than 2% of the total display signal. The highlight region is preferably occurs less than 5% of the total display signal.

Further, to compensate for the loss of black level (indicated by the extrapolation curve 46), and the saturation of while level (indicated by the extrapolation curve 47), the signals in these two regions are interpolated to black (curve 48) and white (curve 49), respectively. In some aspects, a curve may be fitted to key points on the outer regions of the middle tones. In some aspects, a curve may fit a zero input level to a zero output level, such as the shifted black is still mapped to the actual black value (curve 48). In some aspects, a curve may fit a maximum input level to a maximum output level, such as the shifted brightness is mapped to the maximum brightness value (curve 49).

The interpolation can be performed by saturating the signal values, e.g. assigning the rest of the curve values to maximum brightness, then applying a smoothing procedure such as a low pass filter that will reduce the maximum brightness value, so that the curve is transformed from clipping values into asymptotic values, reaching a maximum value at the end of the input range.

Without the interpolated curve 49, the adjusted signals represented by line 45 clips the output before the input value reaches a maximum. The interpolation curve 49 reduces the gain of high-intensity pixels to avoid the clipping artifacts. Also, without the interpolated curve 48, the adjusted signal represented by line 45 provides high gain for very dim pixels, representing a loss of true black as indicated by segment 46. The brightness adjustment thus shifts up the signals in the middle tones, and with gradual reduction in gain in the shadow and highlight regions to avoid clipping and loss of black signals. The transitions are preferably smooth, and preferably to minimize quantization and rounding errors. The typical gain function is indicated by segments 48, 45 and 49 of FIG. 4.

Using these concepts, luminance values represented by the display with a low maximum brightness level may be perceived as represented by the display with a higher maximum brightness level. This is achieved through a boost of the middle tone signals, which essentially increase the pixel current or voltage (for example, in CRT or PDP displays), or increase transparency of light modulated pixels to compensate for the loss of brightness level (for example, in LCD displays). One advantage of these embodiments is that no additional power consumption is needed for increasing the apparent brightness level in the case of light modulated pixels such as LCD displays. In some aspects, the boosted signals are smoothly interpolated at the outer tone regions to reduce loss of black level in the shadow range, or to reduce the clipping artifacts at the highlight range.

The gain correction system and method described above provides an increase in apparent maximum brightness level while keeping contrast fidelity and eliminating gain artifacts introduced by loss of true black and brightness saturation. Thus the present invention provides the ability to calibrate the displays and the ability to modify or correct maximum brightness variation inherent in even the same display models. In these embodiments, the original signal values are boosted across a significant range of values. Therefore, the display brightness is increased significantly over a wide range of signal values.

In some embodiments, the brightness adjustment may be designed or calculated off-line, prior to output to the display, or the adjustment may be designed or calculated on-line as the image is being output to the display. The brightness adjustment model may take the form of an algorithm, a look-up table (LUT) or some other model that may be applied to signal data as described in relation to other embodiments above.

In some embodiments, the gain relationship may be a linear relationship, but other relationships and functions may be used to convert signal values to enhanced signal values.

Figure 5:
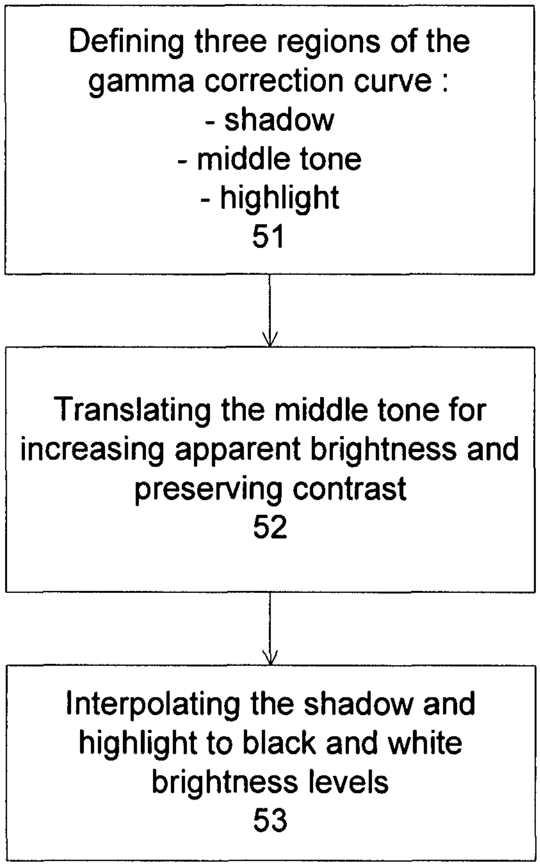
FIG. 5 illustrates an exemplary flowchart for signal adjustment to achieve a higher apparent maximum brightness.

One exemplary embodiment, shown in FIG. 5, may perform as follows. In operation 51, the range of the gamma correction curves is partitioned into 3 regions; a shadow region representing the dark level, a middle tone region, and a highlight region representing the brightness level. The partitioning can be predetermined, such as less than 5% for each outer region, and between more than 5% to more than 95% for the middle tone region. The partitioning can be dynamic, partitioning the signal to achieve less than 5% for each of the outer region from the intensity histogram of the display. Then in operation 52, the middle tone signal values are translated, e.g. shifted up, while preserving the relative contrast to increase the apparent maximum brightness. And in operation 53, the signal values from other outer regions are interpolated to black and white brightness levels respectively.

The present apparent brightness correction can further be incorporated into a color display, in which case three brightness adjusting correction can be included to be operative on respective primary color signals, for example RGB (red, green and blue). In component video, the components necessary to convey color information are transmitted separately, and a weighted sum of the components is computed to form a luma signal, typically denoted by Y', representing brightness. The full space of perceptible colors can be described by RGB color space, CIE XYZ or CIE LUV color space, YIQ color space where Y is approximate intensity and I and Q are chromatic properties, HSV color space where H is hue representing the color family, S is saturation representing the purity of a color, and V is value representing the intensity of a color. In exemplary embodiments, the invention provides methods for correcting maximum brightness variations between manufactured electronic displays, whether these variations arise from the gray signal or the primary color signals.

The primary color response functions might be identical or might be different, and therefore the correction algorithm might be adjusted to individual color curves to preserve color fidelity while increase the apparent brightness of a display without or with minimum loss of relative contrast.

The transfer function of the display is generally not linear. For example, the light intensity reproduced at the screen of a CRT is a non-linear function of its grid voltage input. Generally, for CRT display, the video signal is used as a negative bias voltage for the grid of the CRT to modulate the cathode current. A typical CRT transfer characteristic of the video signals versus display brightness is such that the changes in luminance are not at a fixed ratio for constant input changes. Furthermore, brightness is not simply related to the cathode current in a typical CRT but also dependent on other factors at increase beam current, such as increased aperture losses due to beam-bundle spread and decreased phosphor efficiency due to saturation effects. For CRT, the intensity is approximately proportional to input signal voltage raised to a gamma power, with gamma of a CRT display monitor is typically between 2.2 to 2.8.

Flat panel display devices such as liquid crystal displays (LCDs) also exhibit different nonlinearity transfer function, for example, the transparency of the modulated pixel of a LCD is also a non-linear function of the of its video input, which is an analog voltage level indicating the luminance level of the pixel. Since characteristics of display devices are different, each display device thus utilizes a gamma correction curve to provide linearity between input signal and output brightness in the display.

Figure 6A:
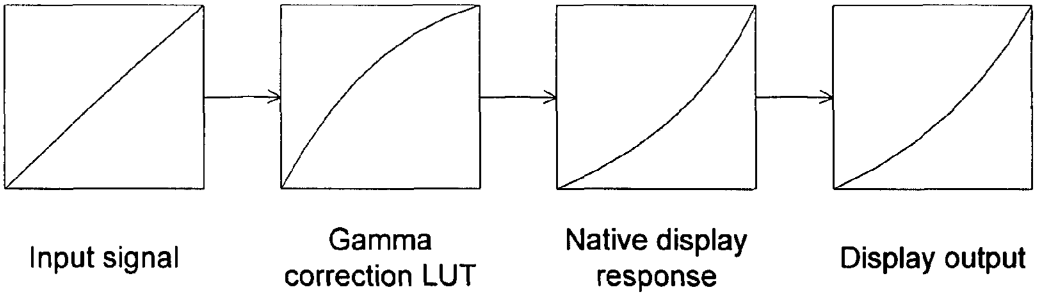
FIGS. 6A-6B illustrate process of non-adjusted and adjusted gamma correction lookup table in conjunction with the native transfer function of the display.

FIG. 6A illustrates a signal process to provide signal fidelity between an input intensity and an output brightness. Given a linear curve of input intensity, the curve first undergoes a gamma correction before reaching the displace device. The gamma correction is designed to compensate for the transfer function of the display device, so that the result brightness returns to the linear shape as the input intensity. For optimum image perception, the brightness curve displayed on the display device should still exhibit a 1.8, 2.2 gamma or a gamma value that may depend on the viewing condition. There are various gamma correction methodologies, for example, gamma correction can be applied at the camera, and signals are maintained in a perceptual domain throughout the system until conversion back to intensity at the display device. Intensity values can be stored in a frame buffer, and then gamma-correct through hardware lookup tables such as the video card lookup table, on the way to the display. The intensity values can also be partially corrected in software, and then partially corrected in the hardware lookup tables. For example, the software gamma correction can be a 1.8 gamma correction, effected by application software prior to presentation of signal values (gray scale or RGB) to the graphics subsystem, and the remainder gamma correction is accomplished in the lookup tables. A lookup table at the output of the frame buffer enables correction of signal representations loaded into the frame buffer. This arrangement can maximize perceptual performance.

The gamma transfer function is different for different types of displays, and even different for the same type of displays, for example different CRT tubes might use different phosphor coatings. Thus, without gamma correction, the brightness response of a display will have a nonlinear, e.g. logarithmic, shape resulting in contrast artifacts, such as low video contrast nearer the dark range. In exemplary embodiments, the video control circuit provides gamma correction lookup table to enable increased apparent brightness level. For example, the video signal can be used to access the contents of the transformed gamma correction lookup table, which represent the magnitude of the voltage that is used to drive a LCD display.

In a conventional gamma correction approach, for a target gamma and the input value j, the output brightness is j to the power of gamma. For example for a display with a maximum brightness of 100 nits and a gamma correction of 1.8, for the input values in the range [0, 1], the input value j=0.5 corresponds to a gamma corrected brightness of $100*0.5^{1.8}=28.7$ nits. This value depends only on gamma and maximum native brightness. The value of 28.7 nits can be altered by modifying the target gamma, but this might provide sub-optimal rendering of images that expect exactly 1.8 display gamma correction.

The typical gamma correction is performed such that the curves loaded in the video card combined with the curves of the native response of the display conduct to a transfer function that is close to a power low function with the exponent the target gamma value. Accordingly, the RGB video card curves cover the range [0, 1] where the set (1, 1, 1) in the video card LUT, corresponds to the white of the display giving the maximum brightness of that display.

In exemplary embodiment, the present invention offers a method in which for a certain target gamma and display brightness, a substantial part of the input gray or color levels including the middle tones are shifted up with a certain amount to increase the luminance in this range. The "middle tones" may refer to a range that covers the true middle tones or an arbitrary sub-range of the input range. The middle tones are all shifted in such a ratio such that the gamma correction for the middle tones is unchanged, but the brightness of the middle tones is higher. The middle tones shift is compensated close to the shadow and highlight range by interpolating the extremities of the shifted range smoothly to 0 (black) and to 1 (white). For a typical portable display, the interpolation process is done for the 5% or less of the shadow range and 5% or less of the highlight range, leaving more than 90% of the input levels (covering the middle tones) available for brightness adjustment while keeping the gamma correction unchanged for this middle tones range. This results in an apparent brightness increase while apparent gamma correction is preserved.

Figure 6B:
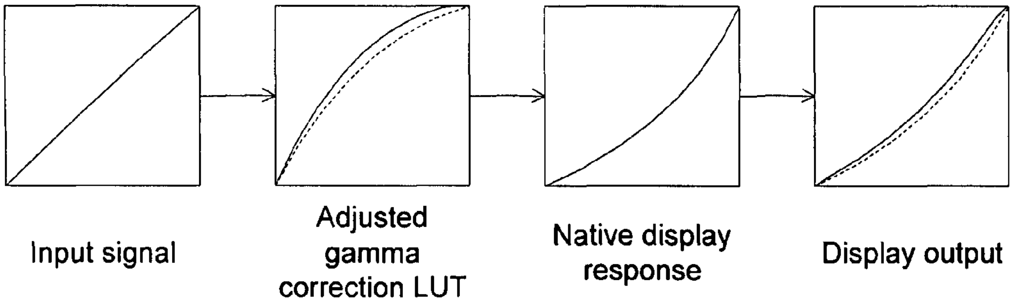

FIG. 6B illustrates an embodiment of the present invention to increase the apparent brightness of a display, while keeping gamma correction unchanged for the middle tone levels. This maintains the relative contrast of images optimized for a certain gamma correction (movies, graphic arts, various other contents) but renders them at higher brightness. The output values of the video card LUT for the middle tone input values is shifted up, which results in a higher brightness of the middle tones, while maintaining the relationship between the LUT values (i.e. same apparent gamma correction) such that the relative contrast of the middle tones is preserved. This increases the apparent brightness of the display while the relative contrast of images is unchanged. For the shadow and highlight input range, the video card LUT values are smoothly interpolated to 0 and respectively 1 in order to ensure the correct rendering of black and whites of the display. The true white and true black values of the display are not changed (max brightness and black level remain unchanged) but the middle tones are shifted to a higher brightness while maintaining constant the gamma correction in that range.

In exemplary embodiments, the apparent brightness adjustment uses the conventional hardware gamma correction, namely the video card look-up table and the correction is performed in real time for any content passing the video card LUT. Since the brightness changes are the result of changes in pixel light modulation, the power consumption of the LCD backlight does not change. In an aspect, the increase of the apparent brightness (the brightness of the middle tones) can be manipulated while the native maximum brightness of the display and the apparent target gamma of the display are unchanged.

In other exemplary embodiments, the present brightness adjustment method can be applied to color signal, e.g. to the LUT of each primary color. Generally, a color display is constituted by three basic colors (e.g. RBG), and therefore each color must be respectively gamma corrected. Display colors are typically formed by using three primary colors, for example, red (R), green (G) and blue (B). A number of shades (for example, 8 bit shades comprises $2^8=256$ shades) of each primary color is generated by the respective color element in a pixel of the display. In certain aspect, each pixel will comprise three color elements of R, G and B. In color system, black and white components can be recreated by blending different portions of the three primary colors. Some display devices also exhibit different transfer function characteristics for different primary color curves, and therefore the gamma correction LUT might comprise one RGB curve or three distinct correction curves for different colors.

Figure 7A:
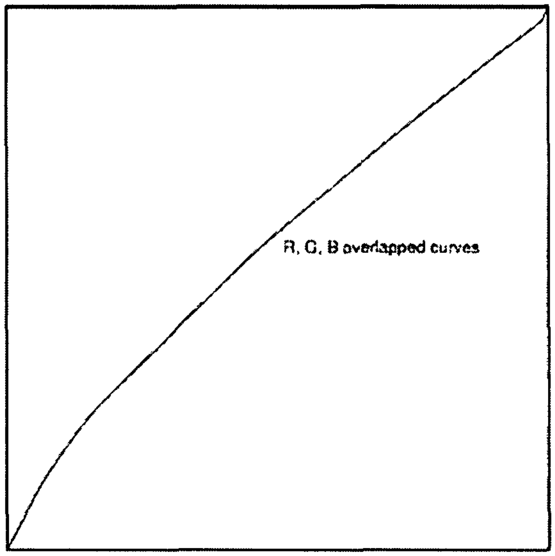
FIGS. 7A-7B illustrate an exemplary adjusted gamma correction LUT for a case of equal curves per channel.
Figure 7B:
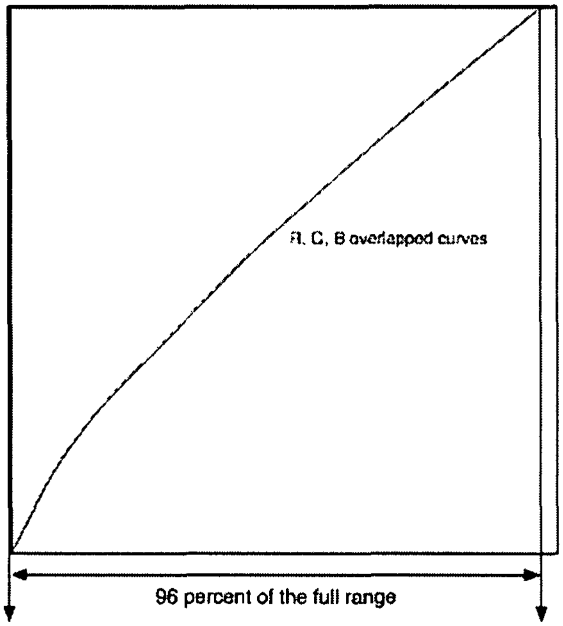

FIGS. 7A-7B illustrate an embodiment where the three primary color RGB are overlapped. FIG. 7A presents the original 1.8 gamma correction LUT for the full range of input signal, using a native white point of D65, and exhibiting a maximum, or native, luminance of 292 nits. FIG. 7B shows the adjusted gamma correction curve with the shadow range is selected to be less than about 1% of the full range in the dark section, the highlight range is selected to be less than about 4% of the full range in the brightness section, and the middle tones is shown to be 96% of the full range. The equivalent brightness for the middle tone signals is 320 nits, which is 9.6% higher than the native maximum brightness level of the display. The signals in the shadow and highlight sections are smoothly interpolated to the native maximum brightness, for example, by applying a low pass filter to produce an asymptotic curve with a smoothly transition with the middle tones and reaching the maximum brightness at the end of the input range.

Figure 8A:
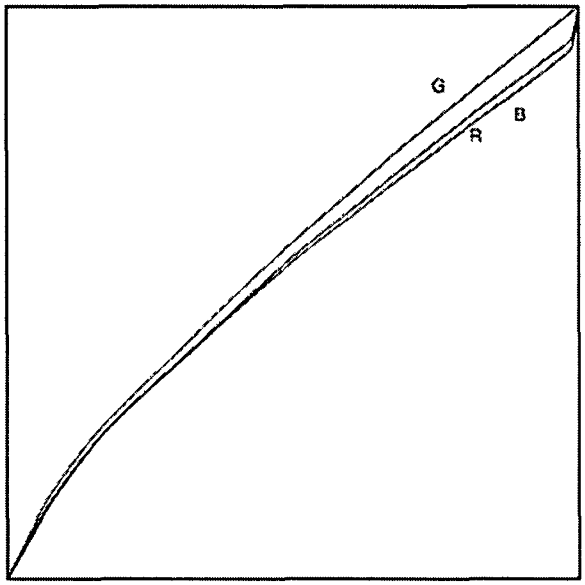
FIGS. 8A-8B illustrate an exemplary adjusted gamma correction LUT for a case of individual curves per channel.
Figure 8B:
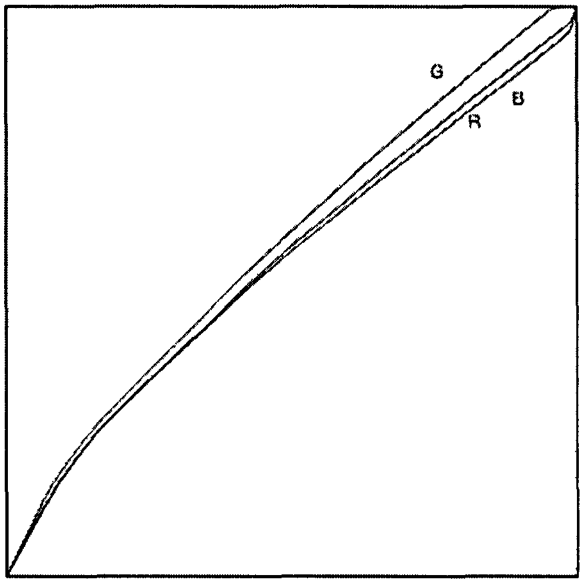

FIG. 8A illustrates an embodiment with three distinct RGB transfer curves with the original R curve, original G curve and the original B curve, exhibiting a full range 1.8 gamma correction LUT with maximum luminance of 268 nits. FIG. 8B shows the range of the middle tones is selected to be 95%, and the three adjusted gamma correction RGB curves, achieving an apparent brightness of 281 nits, which is 4.8% higher than the native maximum brightness of 268 nits. The adjusted R curve and B curve do not saturate in the highlight region, thus there is no interpolation necessary for this range. For the adjusted G curve, smooth interpolation is applied for the highlight region to provide a smooth transition in this range. The adjusted curves could start from the black level, meaning the middle tones extend to the black level. Thus there could be only two regions: a middle tone region and a highlight region.

Figure 9:
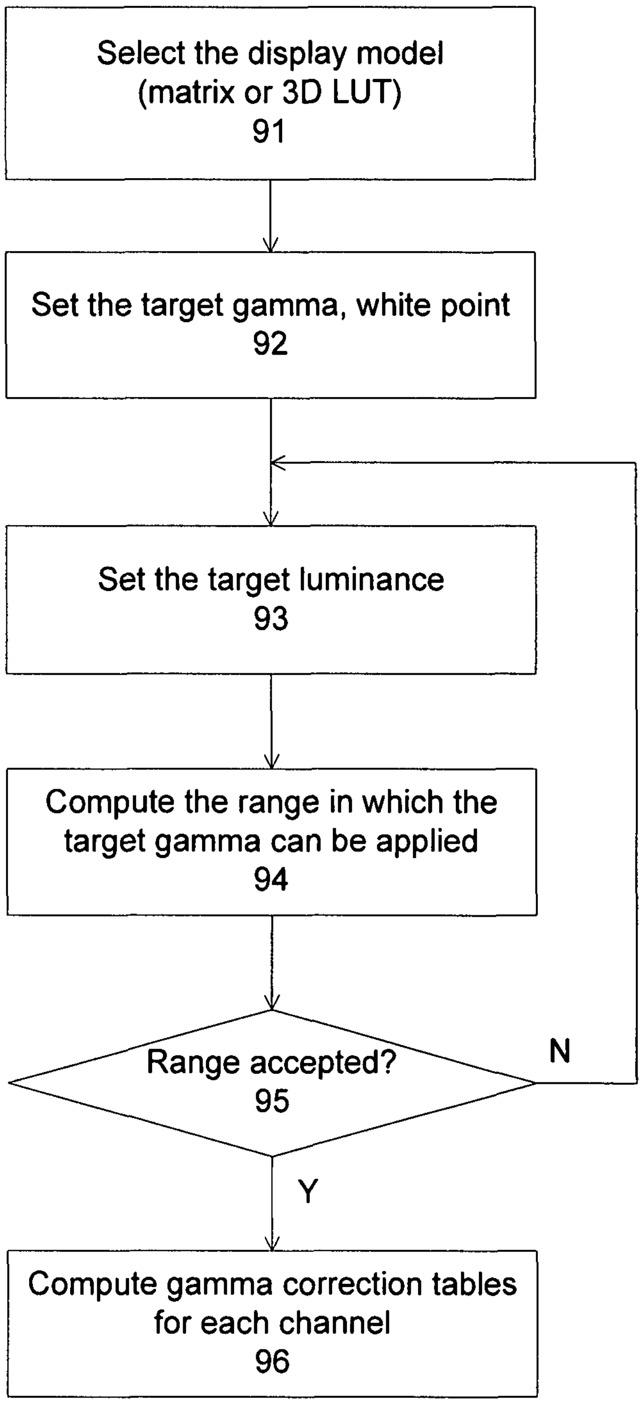
FIG. 9 illustrates an exemplary flowchart for computing the adjusted gamma correction LUT.

In exemplary embodiments, the middle tone range is computed to achieve the best middle tone range, for example, largest range for a given apparent brightness to be reached. In some aspects, knowing the desired apparent brightness value and the maximum brightness value for the display, the middle tone range is computed to achieve the large range to reduce shadow and highlight artifacts. One exemplary embodiment may perform as follows, as illustrated in FIG. 9. In operation 91, a display model is selected, which for example, can be a matrix or a 3D LUT. In operation 92, a target gamma is set and white point is chosen, for example, a white point of D65, representing the color of 6500 K temperature. A target luminance is chosen, in operation 93, and the middle tone range is computed to reach the target luminance using the target gamma, in operation 94. If the middle tone range is too small, e.g. less than a threshold range, the selection of such as small range might introduce artifacts, and thus the computed range might not be suitable (operation 95). In that case, the operation returns to select a different target luminance in operation 93. If the middle tone range is acceptable, then the adjusted gamma correction tables are computed for each color channel using the target luminance and gamma. The adjusted gamma correction tables are then used to adjust the video signal coming to the display to increase the apparent brightness of the display. The adjusted gamma correction tables can be implemented in the video lookup tables, replacing the original gamma correction tables.

In exemplary embodiments, the brightness adjustment can be used to accommodate for the difference between the brightness of two displays, e.g. located side by side. In one aspect, the brightness adjustment can generate a default calibration that compensates brightness differences of various displays. The process can further match the brightness of two displays of different manufacturers, or of different products without changing the Colorsync profiles or without changing the gamma correction of the middle tones.

The method derives gamma corrections for both displays and shifts the gamma correction curve of the displays so that they are matched. The curve shifting comprises adjusting the luminance of the middle tones and the modification of the highlight section (and optionally the shadow section) to provide smooth transitions. The curve shifting is incorporated into the video LUT to dynamically provide shifted signals to the display panel. In an aspect, the adjustment is applied to the lower luminance display in order to match the higher luminance display. In other aspect, the process can be performed for the high luminance display to lower its apparent brightness by shifting the entire gamma correction LUT to lower levels. In yet another aspect, both displays can adjust their brightness to achieve a third apparent brightness different from the maximum brightness of either display.

In exemplary embodiments, the present invention describes methods and apparatuses for the correction of brightness non-uniformities in electronic displays, for example, from variations in technologies, materials, manufacturing and operational parameter. Brightness non-uniformities are visible to the viewer if higher than the threshold sensitivity for brightness, especially when comparing to each others. Even among the displays within one product line, the physical characteristics are not completely identical, causing brightness not to be uniform when driven in the same condition. The variation can be further increased after gamma correction, white balance and color temperature compensation. Thus to achieve brightness uniformity, the conventional brightness correction mechanism degrades the better displays to match the performance of the worse one. For example, the display with the lowest brightness is selected as a reference and the brightness of other display panels is reduced to match that level.

In exemplary embodiments, the present invention discloses a brightness correction mechanism that can improve the performance of the worse displays to match that of the best display. For example, the display with the highest brightness can be selected as a reference and the brightness of other display panels is increased to match that level. In one aspect, the present invention increases the apparent brightness for a display having a lower brightness than an optimum or desired value. In other aspects, by adjusting the video card gamma correction LUT, the present invention can boost the brightness of the natural images, for example, in the iPhoto, Preview, DVD, QuickTime, without altering its content.

In an embodiment, the brightness correction can be applied after the gamma correction procedure for each display. In other aspect, since the gamma correction procedure is time consuming, a standard gamma correction curve can be applied to a group of display devices. In that case, the brightness correction can be similar for that group of displays.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 10:
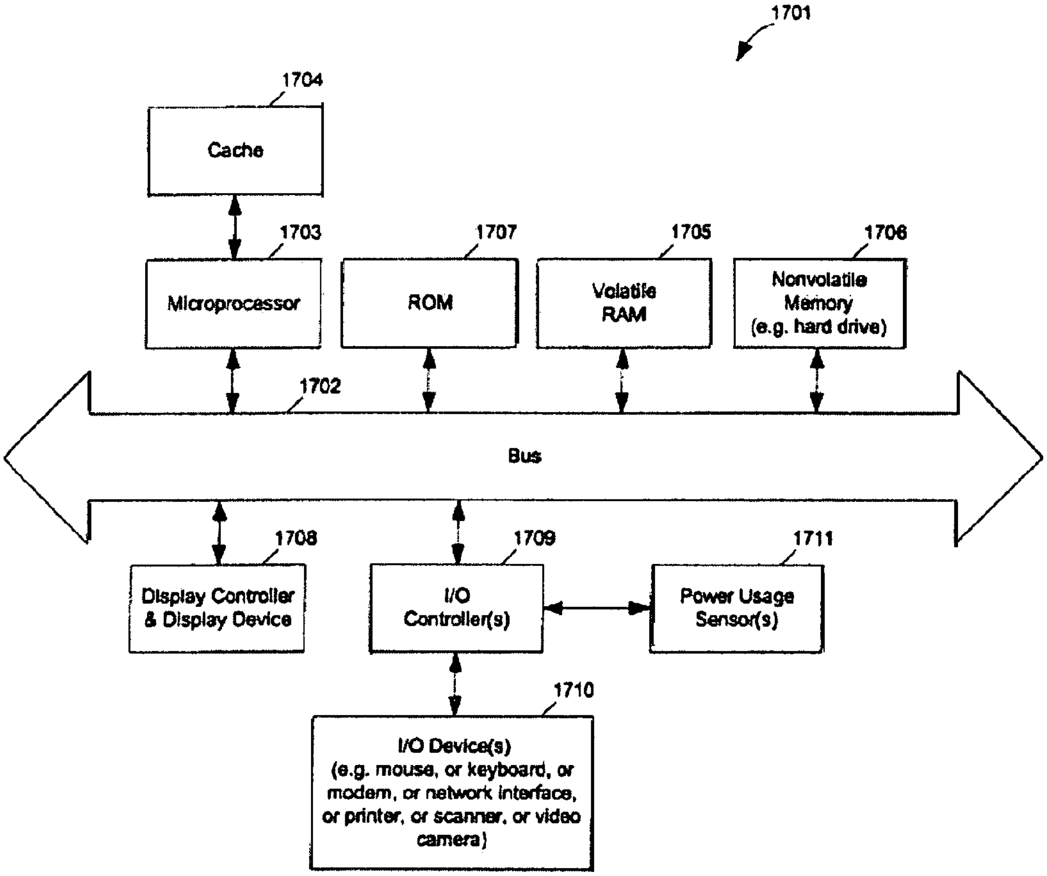
FIG. 10 shows a block diagram example of a data processing system which may be used with the present invention.

FIG. 10 shows one example of a typical computer system which may be used with the present invention. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 10 may, for example, be an Apple Macintosh computer.

As shown in FIG. 10, the computer system 1701, which is a form of a data processing system, includes a bus 1702 which is coupled to a microprocessor 1703 and a ROM 1707 and volatile RAM 1705 and a non-volatile memory 1706. The microprocessor 1703, which may be, for example, a G3, G4, or G5 microprocessor from Motorola, Inc. or IBM or a Pentium microprocessor from Intel is coupled to cache memory 1704 as shown in the example of FIG. 10. The bus 1702 interconnects these various components together and also interconnects these components 1703, 1707, 1705, and 1706 to a display controller and display device 1708 and to peripheral devices such as input/output (I/O) devices which may be mice, keyboards, modems, network interfaces, printers, scanners, video cameras and other devices which are well known in the art. Typically, the input/output devices 1710 are coupled to the system through input/output controllers 1709. The volatile RAM 1705 is typically implemented as dynamic RAM (DRAM) which requires power continually in order to refresh or maintain the data in the memory. The non-volatile memory 1706 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 10 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1702 may include one or more buses connected to each other through various bridges, controllers and/or adapters as is well known in the art. In one embodiment the I/O controller 1709 includes a USB (Universal Serial Bus) adapter for controlling USB peripherals, and/or an IEEE-1394 bus adapter for controlling IEEE-1394 peripherals.

In one embodiment, the display exhibits nonlinear transfer function characteristics, and the display controller comprises a video card having a gamma correction lookup table. In other embodiments, the gamma correction table is adjusted to achieve a desired apparent maximum brightness.

A plurality of adjusted gamma correction table, corresponded to a plurality of displays, can be predetermined and stored in memory together with the display identification. For example, when a display is fabricated, the maximum brightness of this display is determined. If this maximum brightness is different, an adjusted gamma correction table for this display is computed, to provide the display with the appropriate apparent maximum brightness. For example, if the maximum brightness of a particular display is less than the desired maximum brightness, the middle tone range can be determined, the signals in the middle tone range are boosted, the signals in the outer ranges are smoothly interpolated, and then the adjusted gamma correction table using this information is stored in memory together with this display identification. This process can provide the computer with information needed to compensate for the variation in display characteristics.

Figure 11:
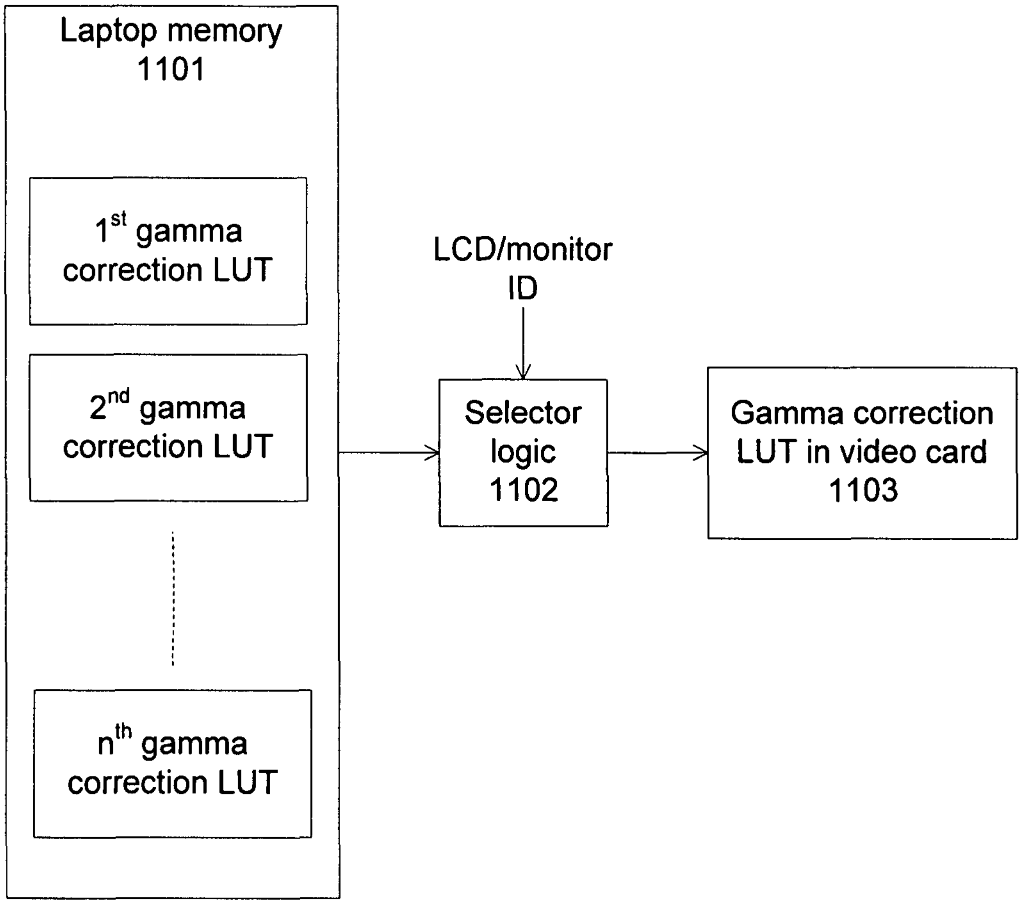
FIG. 11 illustrates an exemplary embodiment of a data processing system to provide compensation for variations in display brightness.

FIG. 11 illustrates an exemplary apparatus for the process of ensuring brightness consistency across a data processing model such as a laptop computer. Storing in the laptop (or CPU) memory 1101 is a plurality of adjusted gamma correction LUT, each associated with a display (LCD or monitor) ID. The display ID drives a selector logic 1102 to select the proper gamma correction LUT to be store in the video card 1103. When a new display is connected, the process is repeated and a new gamma correction LUT is loaded, thus ensuring that the variations in display is compensated and all displays represent the same brightness when using with the laptop computer.

In one embodiment, a hardware or software driver for a display is provided, which contains the adjusted gamma correction table. The software driver allows the adding, upgrading or exchanging display within a data processing system and still effectively provides a consistent brightness against the manufacturing variations. The data processing systems can be connected to different displays, including primary display or secondary display, upgraded display, exchanged display or replaced display. For optimizing different configurations, an exemplary embodiment of the present invention provides a software driver for each display, comprising the information about the display with regard to maximum brightness, native response function, and gamma correction table.

In one embodiment, another display is connected to the data processing system. Then, the adjusted gamma correction table for this display is identified using the software driver of the display. The apparent brightness of the new display is the performed using the updated gamma correction table.

It will be apparent from this description that aspects of the present invention may be embodied, at least in part, in software. That is, the techniques may be carried out in a computer system or other data processing system in response to its processor, such as a microprocessor or a microcontroller, executing sequences of instructions contained in a memory, such as ROM 1707, volatile RAM 1705, non-volatile memory 1706, cache 1704, or other storage devices, or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1703, or a microcontroller.

A machine readable medium can be used to store software and data which when executed by a data processing system causes the system to perform various methods of the present invention. This executable software and data may be stored in various places including for example ROM 1707, volatile RAM 1705, non-volatile memory 1706 and/or cache 1704 as shown in FIG. 10. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 1701 of FIG. 10.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to adjust a brightness of a monitor, the monitor comprising a black level and a maximum brightness level, the method comprising:

partitioning a signal coming to the monitor into three brightness regions: a shadow region, a highlight region, and a middle region;

shifting up signal values for the middle region with a gamma correction of the monitor based on multiplying only the signal values for the middle region with a factor to increase the brightness while preserving a relative contrast, wherein preserving relative contrast comprises keeping substantially constant a shape of a gamma correction curve of the monitor for the middle region; and interpolating in a non-linear manner the signal values in the highlight region to the maximum brightness level, wherein the middle region comprises a range of at least 90% of the signal values, wherein the range of the middle region is computed to achieve a target luminance.

2. A method as in claim 1 wherein the middle region comprises from less than 5% maximum brightness level to more than 95% maximum brightness level.

3. A method as in claim 1 wherein the signal values are compensated by gamma correction.

4. A method as in claim 1 wherein shifting up signal values is based on data from a look-up table from a video card inputting to the monitor.

5. A method as in claim 1 wherein preserving the relative contrast is maintained by keeping substantially constant the shape of the gamma correction curve of the monitor over a substantial portion of the curve.

6. A method as in claim 1 wherein adjusting the brightness of the monitor does not increase a power consumption of the monitor.

7. A method as in claim 1 wherein the signal coming to the monitor comprises a gray level signal.

8. A method as in claim 1 wherein the signal coming to the monitor comprises a plurality of color signals, and a brightness adjustment is applied to the plurality of color signals.

9. An apparatus comprising:

a display monitor that includes a black level and a maximum brightness level; and a display controller to partition a signal coming to the display monitor into three brightness regions: a shadow region, a highlight region, and a middle region, to shift up signal values for the middle region with a gamma correction based on multiplying only the signal values for the middle region with a factor to increase the brightness while preserving a relative contrast, wherein preserving relative contrast comprises keeping substantially constant a shape of a gamma correction curve of the display monitor for the middle region, to interpolate in a non-linear manner the signal values in the highlight region to the maximum brightness level, wherein the middle region comprises a range of at least 90% of the signal values, wherein the range of the middle region is computed to achieve a target luminance.

10. The apparatus of claim 9 wherein the middle region comprises from less than 5% maximum brightness level to more than 95% maximum brightness level.

11. The apparatus of claim 9 wherein the signal values are compensated by gamma correction.

12. The apparatus of claim 9 wherein shifting up signal values is based on data from a look-up table that is loaded into the display controller.

13. The apparatus of claim 9 wherein preserving the relative contrast is maintained by keeping substantially constant the shape of the gamma correction curve of the display monitor over a substantial portion of the curve.

14. The apparatus of claim 9 wherein adjusting the brightness of the display monitor does not increase a power consumption of the display monitor.

15. The apparatus of claim 9 wherein the signal coming to the display monitor comprises a gray level signal.

16. The apparatus of claim 9 wherein the signal coming to the display monitor comprises a plurality of color signals, and a brightness adjustment is applied to the plurality of color signals.

17. An article of manufacture comprising a non-transitory machine accessible storage medium including data that when accessed by a machine, cause the machine to perform operations comprising:

partitioning a signal coming to the monitor into three brightness regions: a shadow region, a highlight region, and a middle region;

shifting up signal values for the middle region with a gamma correction based on multiplying only the signal values for the middle region with a factor to increase the brightness while preserving a relative contrast, wherein preserving relative contrast comprises keeping substantially constant a shape of a gamma correction curve of the monitor for the middle region; and interpolating in a non-linear manner the signal values in the highlight region to the maximum brightness level, wherein the middle region comprises a range of at least 90% of the signal values, wherein the range of the middle region is computed to achieve a target luminance.

18. An article as in claim 17 wherein the middle region comprises from less than 5% maximum brightness level to more than 95% maximum brightness level.

19. An article as in claim 17 wherein the signal values are compensated by gamma correction.

20. An article as in claim 17 wherein shifting up signal values is based on data from a look-up table from a video card inputting to the monitor.

21. An article as in claim 17 wherein preserving the relative contrast is maintained by keeping substantially constant the shape of the gamma correction curve of the monitor over a substantial portion of the curve.

22. An article as in claim 17 wherein adjusting the brightness of the monitor does not increase a power consumption of the monitor.

23. An article as in claim 17 wherein the signal coming to the monitor comprises a gray level signal.

24. An article as in claim 17 wherein the signal coming to the monitor comprises a plurality of color signals, and a brightness adjustment is applied to the plurality of color signals.

* * * * *